US005084688A

United States Patent [19]

Martino

[11] Patent Number: 5,084,688

[45] Date of Patent: Jan. 28, 1992

[54] MINIATURIZED POWER RELAY FOR PRINTED CIRCUITS

[75] Inventor: Albertoni Martino, Inverigo, Italy

[73] Assignee: Carlo Gavazzi Electromatic AG, Baar, Switzerland

[21] Appl. No.: 576,620

[22] Filed: Aug. 31, 1990

[30] Foreign Application Priority Data

Oct. 30, 1989 [CH] Switzerland ........................ 03922/89

[51] Int. Cl.$^5$ ............................................ H01M 51/22

[52] U.S. Cl. ....................................... 335/78; 335/128; 335/83

[58] Field of Search .................................... 335/78-85, 335/124, 128, 129, 202

[56] References Cited

U.S. PATENT DOCUMENTS 4,258,344 3/1981 Nishimi ............................... 335/129
4,472,699 9/1984 Fujii et al. ............................ 335/84
4,689,587 8/1987 Schroeder ........................... 335/128

*Primary Examiner*—Gerald P. Tolin
*Assistant Examiner*—Lincoln Donovan
*Attorney, Agent, or Firm*—Herbert Dubno

[57] ABSTRACT

The miniaturized power relay for printed circuits comprises an electromagnetic circuit (2) complete with coil (39), a contact-holder block (3) provided with an actuator (25) and a protection and sealing covering (4); the magnetic circuit has exclusively a fixed supporting element (5) and a movable keeper element (6) the respective polar expansions whereof (7, 8) are conveniently shaped so as to reduce dimensions and are accommodated inside the coil to use all of the magnetic flux which is generated by the coil itself.

7 Claims, 6 Drawing Sheets

MINIATURIZED POWER RELAY FOR PRINTED CIRCUITS

FIELD OF THE INVENTION

The present invention relates to a miniaturized power relay for printed circuits.

BACKGROUND OF THE INVENTION

As is known, the extremely widespread use of relays in many fields of electrical technology, telecommunications, electronics and, in particular, of automation is due to the versatility of the numerous types provided. In particular, the trend of manufacturing of electronic devices, which currently use the miniaturized relays, is to reduce their dimensions and make them as compact as possible.

The manufacturing of electronic devices aims most of all reduce the size of the relays, as well as to reducing the gauge of the electronic boards on which the relays are mounted.

In view of the above, relay manufacturers are therefore induced to manufacture relays that have smaller dimensions, especially in terms of height, and are increasingly sensitive, i.e. have a lower power consumption so as to reduce the dimensions of the power supply transformers.

A magnetic circuit of the current miniaturized relays has an electromagnet which is excited by an electric current which flows through its coil so as to attract a movable keeper or armature against a pole face or extension thereof.

The movement of the keeper is conveniently used to provide the required switching of the contacts.

The return of the movable keeper to the idle position, after the excitation current has ceased, is provided by means of a spring and generally by means of elastic contact-holder laminas of the relays.

The number, the arrangement of the contacts and the sequence of the movements naturally vary according to the purposes to which the relay is assigned.

Current power relays, depending on their structure, have their pole extensions arranged externally to the coil and/or shaped so as to generate magnetic losses in the circuit with a partial use of the flux produced by the coils and consequently with a low magnetic efficiency.

Another disadvantage to which current miniaturized relays are often subject is the difficulty in assembling the contact-holder block and the electromagnetic circuit-holder block and the adjustment thereof.

Not least, the need to insulate the contacts from the magnetic circuits by enlarging of surface distances in excess of 8 mm and a dielectric strength in excess of 4 KV, as required by the currently applicable norms, necessarily entails the use of insulating plates which sometimes cause an increase in the external dimensions of the relay with all the consequences which derive from this.

OBJECTS OF THE INVENTION

It is therefore an object of the present invention provide a miniaturized power relay for printed circuits which has extremely modest coil absorption and small dimensions.

A further object of the present invention is to provide a miniaturized relay which despite having reduced dimensions has a dielectric strength in excess of 4 KV between the magnetic circuit, complete with coils, and the contact block, with a surface distance of at least 8 mm between the metallic parts thereof.

Still another object of the invention is to provide a miniaturized relay which allows an extremely simple and automated assembly of the magnetic circuit block with the contact block having a simple adjustment characterized by a small number of operations.

SUMMARY OF THE INVENTION

These objects are achieved by a miniaturized power relay for printed circuits which comprises: an electromagnetic circuit complete with coil, a contact-holder block provided with an actuator, and a protection and sealing covering according to the invention the magnetic circuit comprises a fixed supporting element and a movable keeper element the respective pole expansions of which are accommodated inside the coil so that all of the magnetic flux generated thereby is used.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
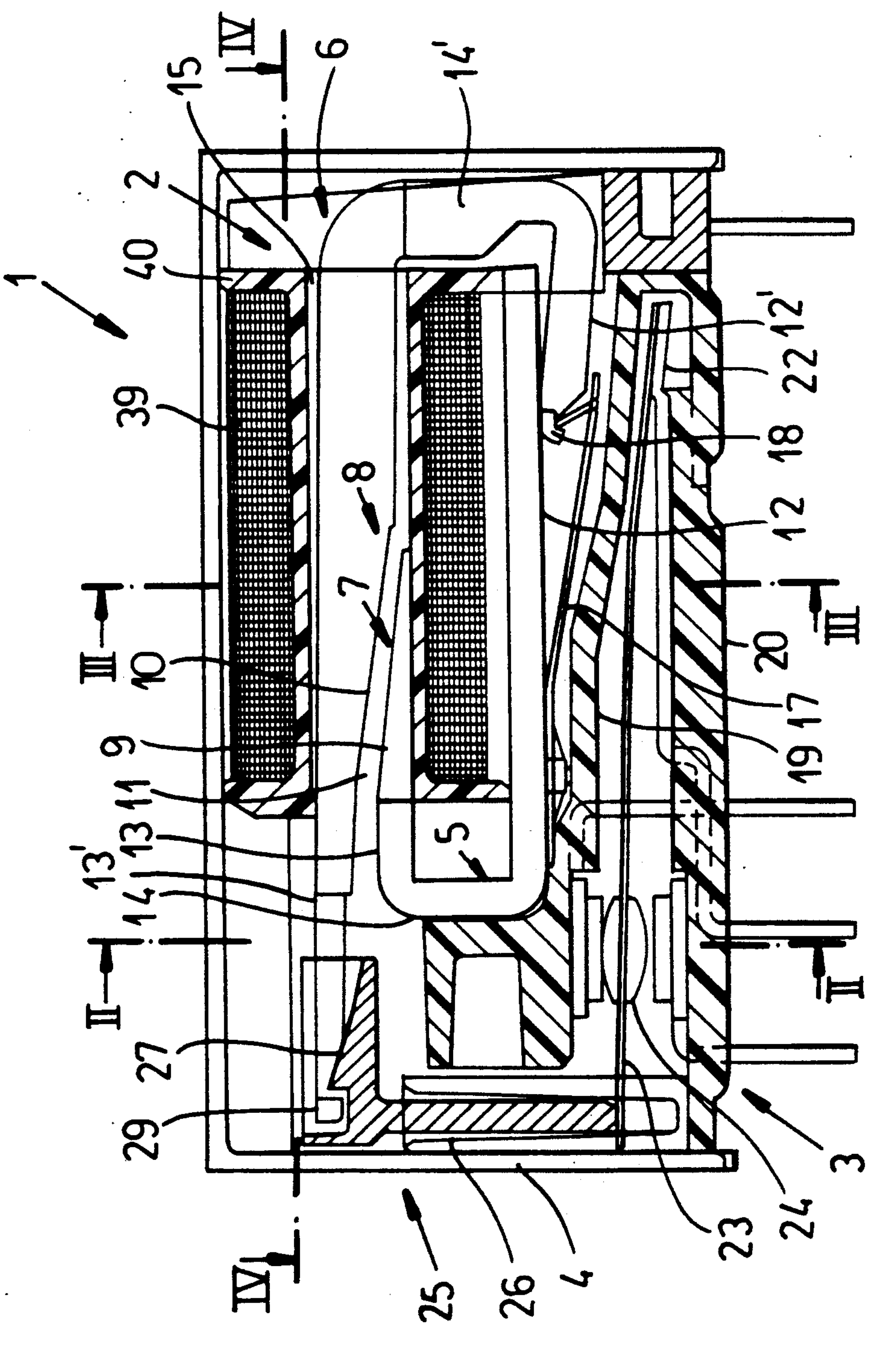
FIG. 1 is a transverse sectional lateral elevation view of the relay.
Figure 2:
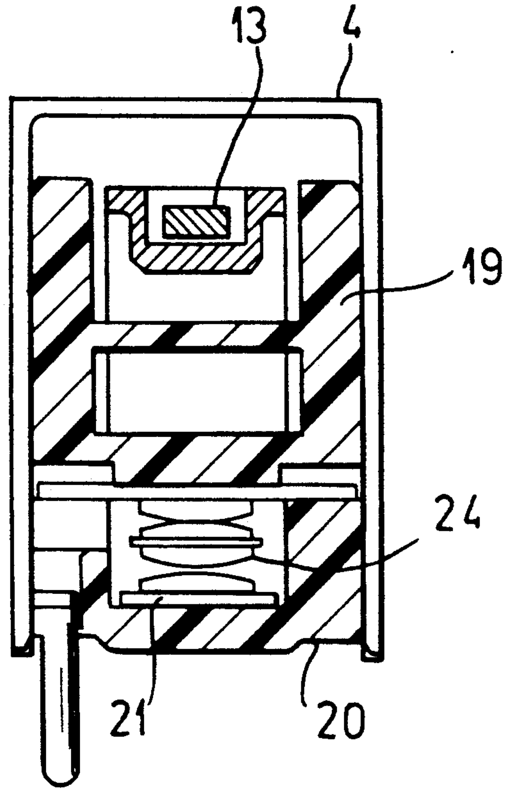
FIG. 2 is a view taken along the section line II—II of FIG. 1.

The miniaturized relay according to the invention, generally indicated by the reference numeral 1, comprises an electromagnetic circuit 2 complete with a coil 39, a contact-holder block 3 provided with an actuator 25, and a protection and sealing covering 4.

The magnetic circuit with low magnetic loss is composed of two pieces of pure iron. One piece is fixed and defined by a fixed supporting element 5, and the other one is movable and is defined by a movable keeper element 6.

The fixed supporting element 5 and the movable keeper element 6 have their respective pole expansions 7 and 8 accommodated inside a coil 39 so as to use effectively the flux produced by the coil.

Each of the polar expansions 7 and 8 furthermore has an inclined surface 9 and 10. The surfaces are dimensioned and mutually matched so as to maximally contain their bulk and obtain the best magnetic efficiency of the circuit.

Furthermore, as mentioned, in order to allow the use of all of the flux generated by the coil, the attraction gap 11 between the polar expansions is internal to the coil 39.

Particularly, as can be seen in FIG. 1, the keeper element 6 and the supporting element 5 substantially have a U-shaped configuration which is defined by a first wing and by a second wing, respectively indicated by 12, 13 and 12', 13', which are connected by a respective crosspiece 14, 14'.

Advantageously, as mentioned, the supporting element and the keeper element are entirely made of pure iron so that the magnetic circuit is composed of only two parts instead of three.

The first wing 12 of the supporting element 5 is larger than its second wing 13 and is external to the coil 39, whereas the first wing 12' of the keeper element 6 is smaller than the second wing 13' thereof and is also external to the coil 39.

In particular, the second wings 13, 13' of the supporting element and of the keeper element are inserted from opposite sides of a through hole 15 in the coil 39.

The through hole 15 conveniently has a rectangular cross-sectional configuration.

The supporting element 5 is rigidly associated with the coil by virtue of the exact coupling of its internal and external wings 13 and 12 with the plastic spool 40 of the coil.

The keeper element 6 is associated, so as to be able to oscillate, with the supporting element by means of an elastic element 17 which has one of its ends, 17' rigidly associated with the supporting element 5 and its opposite end engaged in a recess 18 defined on the end of the keeper element. The recess 18 furthermore coincides with the oscillation axis or fulcrum of the keeper element.

The position of the fulcrum of the keeper element, shown in FIG. 1 on the back of the supporting element, can also be arranged, for example, according to the requirements, on the end of the supporting element or on the back or inside it; in this case the length of the wing 12 of the keeper element is practically zero.

In the case shown in FIG. 1, the particular position of the fulcrum of the keeper element is approximately at one third of the length of the first wing of the supporting element so as to obtain a perfect balancing of the keeper element with respect to the oscillation axis.

Advantageously, the particular configuration of the polar expansions furthermore causes the sum of the area of the co-planar sections of the polar expansions of the supporting element and of the keeper element to be equal along the entire length of the polar expansions so as to provide minimal dimensions with constant induction in the iron.

In order to comply with the currently applicable laws, the relay has an insulation plate 19 made of thermoplastic material and suitable for providing a dielectric strength of 4 KV between the contacts and the magnetic circuit with a surface distance thereof in excess of 8 mm.

The insulation plate 19 is associated with a base 20 which is made of insulating material, more precisely also made of thermoplastic material, on which the fixed contact-holders 21 and a movable contact-holder 22 are mounted; an elastic lamina 23 is rigidly coupled to said movable contact-holder 22 with a first end by means of welding or riveting and supports, in a substantially terminal position, a contact 24 which is movable between the fixed contacts 21.

The contact-holder block 3 described above relates, for example, to a relay with a single switching contact, but as is obvious to a skilled worker in the field the same type of construction is also valid for two switching contacts mounted side by side on the contact-holder bases and actuated by the same actuator 25.

The relay also comprises actuation means for converting the rotary motion of the second wing 13' of the keeper element 6 into a translatory motion of the actuator 25 of the elastic lamina 23 for the movement of the movable contact 24 between the fixed contacts.

More precisely, the actuation means comprises a guiding channel 26 which has, in cross section, a frustum-like configuration and is associated with the base 20.

The actuator element 25 is slidable inside the guiding channel 26 and is connected in an articulated manner to the second wing 13' of the keeper element which is guided, on the narrowest side of the channel 26, adjacent to the end of the lamina 23.

The coupling between the end of the second wing of the keeper element and the actuator element occurs by virtue of automatic coupling means and more precisely by means of a slide-like element 27 which is present on the upper part of the actuator element and defines therewith a rotatable retention seat 28.

Two mutually opposite coaxial expansions 29 insert snap-together inside the seat 28 and extend laterally from the ends of the second wing of the keeper element.

This technical solution advantageously allows the actuator element to perform a rectilinear translatory motion inside the guiding channel with virtually no friction.

Figure 3:
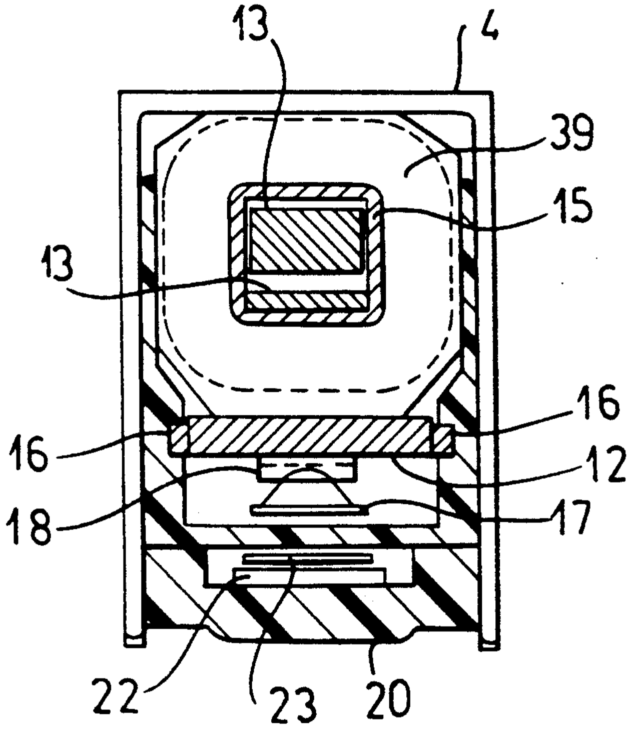
FIG. 3 is a view taken along the section line III—III of FIG. 1.
Figure 4:
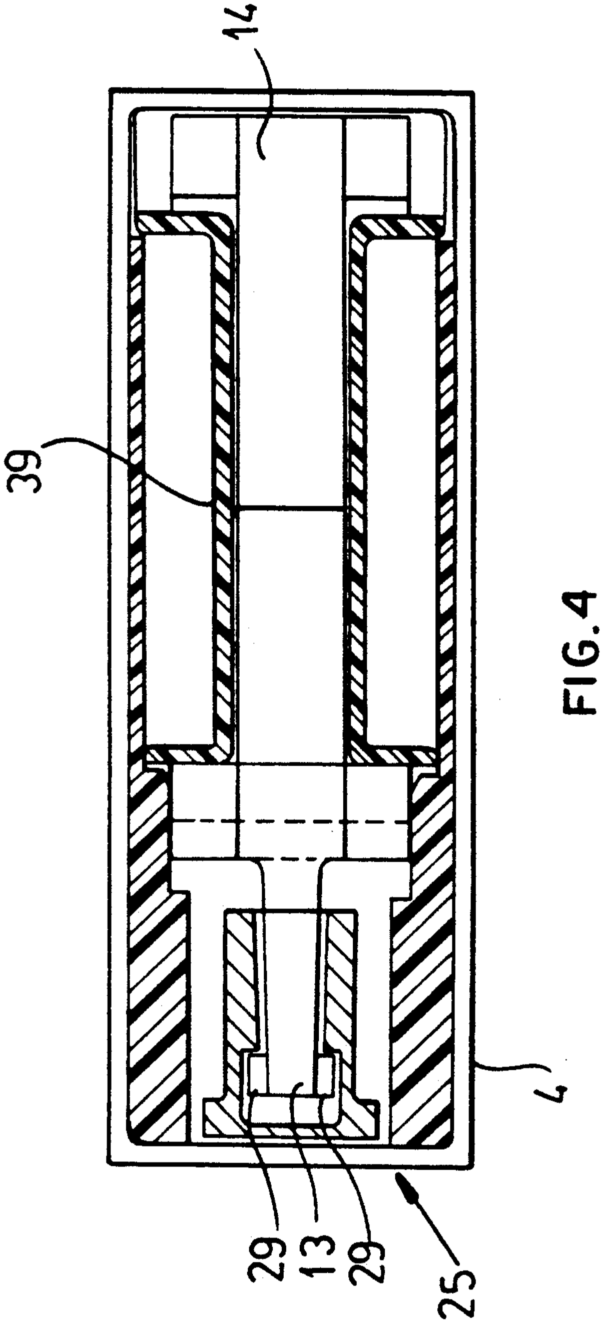
FIG. 4 is a view taken along the sectional line IV—IV of FIG. 1.
Figure 5:
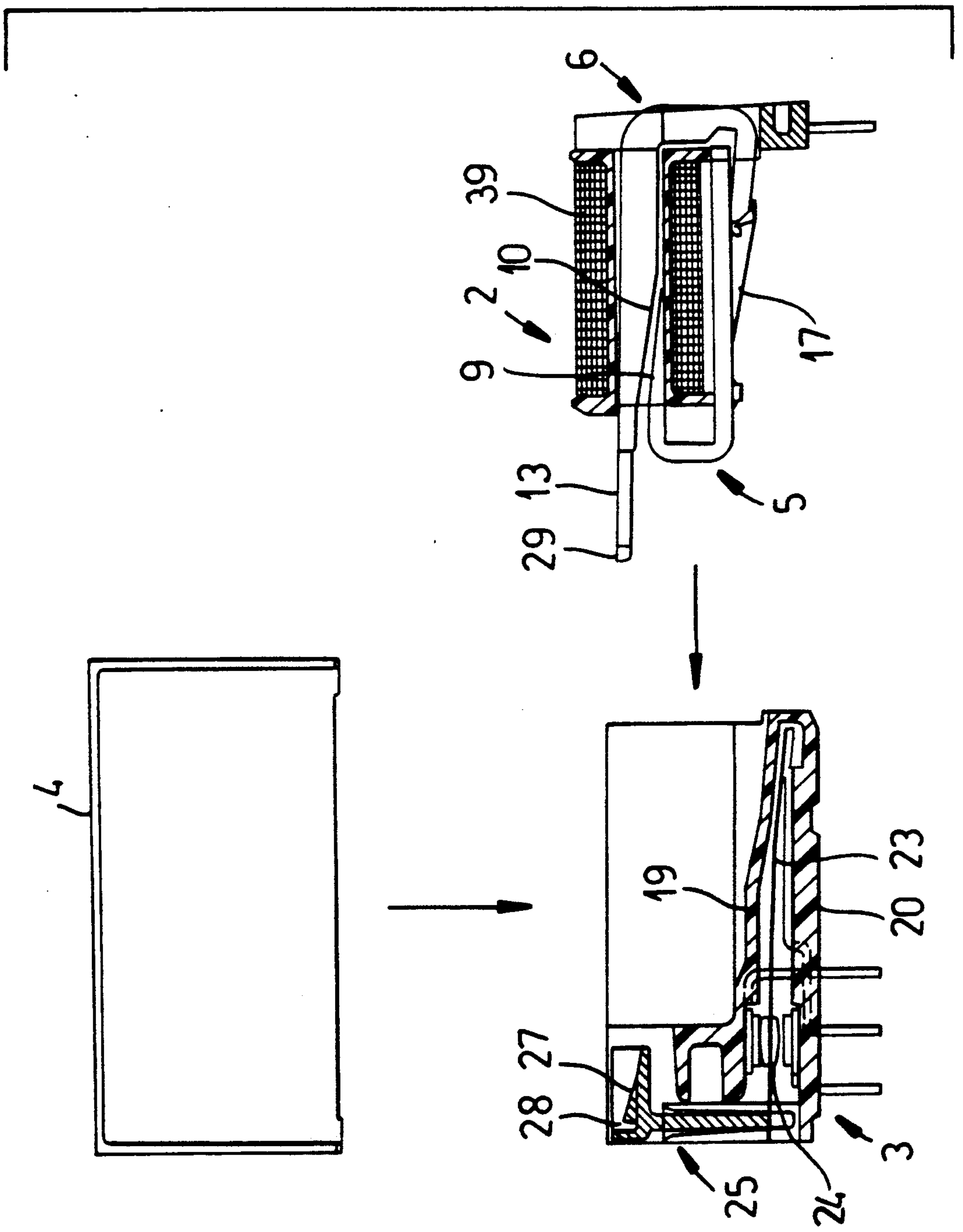
FIG. 5 is a diagram showing steps of the assembly of the magnetic circuit-holder block with the contact-holder block and with a protection and sealing covering.

The above furthermore allows, in an extremely simple manner, to associate the circuit-holder block with the contact-holder block, as shown in FIG. 5, with a simple longitudinal translatory motion so as to couple the two blocks by interpenetration, using appropriate snap-together elements which are shown in FIG. 3 and are defined by the wings 16 defined on the supporting element and by the corresponding grooves defined on the insulation plate so as to ensure the stable relative position of the two blocks in the course of time.

As shown in FIG. 5, the two blocks are covered by a protection covering 4 and then sealed by means of a considerable amount of sealing resin.

Finally, it should be noted that the structure of the relay according to the invention allows a further very important advantage, i.e. it allows a simplified adjustment of the stroke limit of the elastic lamina 23.

Essentially, the adjustment is performed simply by carrying out a possible deformation of the end of the second wing 13 of the keeper element 6 so as to obtain the pre-required force of the movable contact on the fixed one.

The operation of the miniaturized power relay according to the invention is evident from what is described and illustrated. In particular, when the magnetic circuit-holder block is connected to the contact-holder block, the end of the second wing 13 of the keeper element 6 engages snap-together and in an articulated manner with the actuation element 25, which by moving without friction, as mentioned, within the guiding channel 26, acts on the ends of the elastic lamina 23.

When current flows through the coil 39, the keeper element 6 is attracted by the supporting element 5, and by rotating about the fulcrum axis 18 it performs, at the end of the second wing 13, an active stroke, transferring the movement, by means of the actuator element 25, to the end of the elastic lamina 23, switching the contacts.

In practice it has been observed that the miniaturized power relay according to the invention is particularly advantageous in that it has extremely reduced dimensions especially in terms of height and it is extremely sensitive and therefore has a low consumption so as to allow to reduce the dimensions of the power supply transformers.

Since it has appropriately shaped polar expansions arranged inside the coil, the magnetic circuit made of only two parts (a fixed supporting element and a movable keeper element), facilitates the best magnetic efficiency of the circuit since said circuit has less magnetic losses and all of the flux produced by the coil is furthermore used.

Finally, the relay complies with the currently applicable laws on the subject, since the insulation which is generated between the magnetic circuit and the contact block has a dielectric strength in excess of 4 KV with a surface distance of 8 mm between the metallic parts thereof, though extremely reduced external dimensions are maintained.

Figure 6:
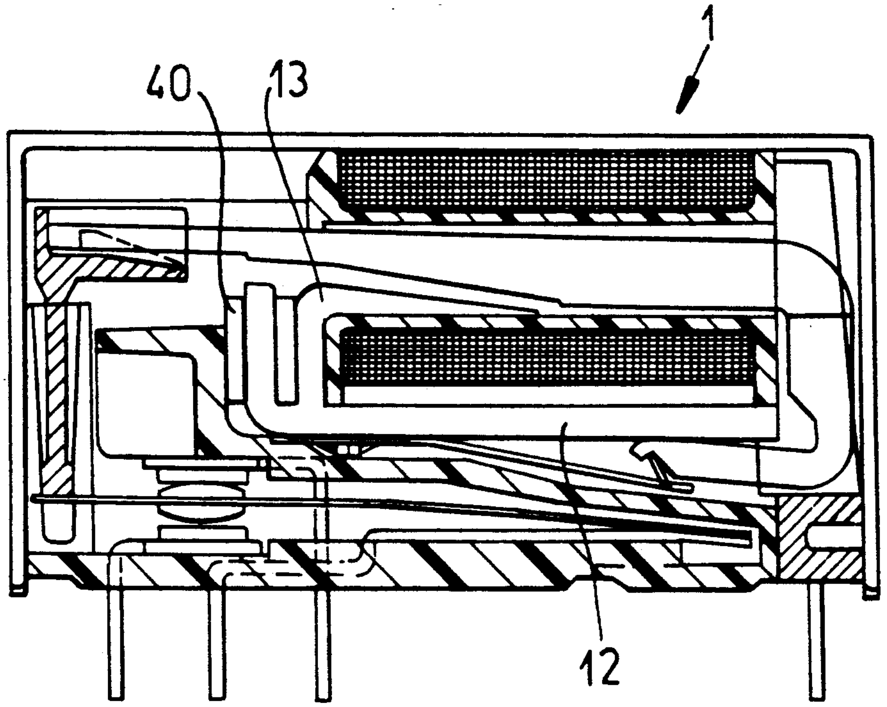
FIGS. 6 and 7 illustrate embodiments of the relay according to the invention, in the form of an alternating-current relay and a bistable permanent-magnet relay, respective.
Figure 7:
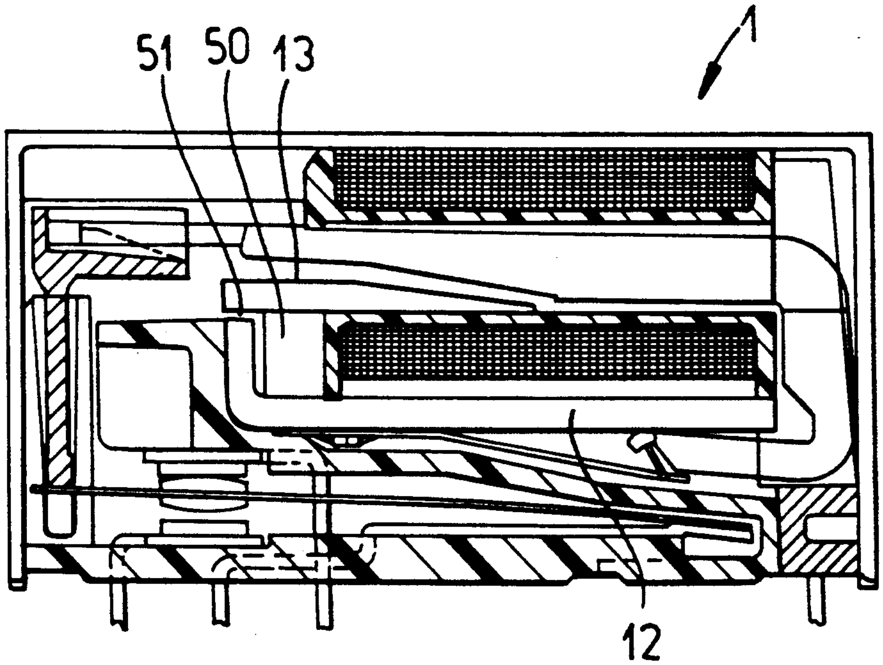

FIGS. 6 and 7 illustrate two relays according to the invention, the first one for alternating current and the second one of the bistable type with a permanent magnet, wherein the numeral 40 (FIG. 6) indicates a short-circuit turn and, in FIG. 7, 50 indicates a permanent magnet and 51 indicates the gap.

In practice, the materials employed, as well as the dimensions, may be any according to the requirements and to the state of the art.

I claim:

1. A miniaturized power relay for printed circuits, comprising:

a housing having a base formed generally with a U-shaped cross-section having a first insulating plate extending longitudinally in a first direction and a second insulating base plate extending longitudinally in a second direction opposite said first direction and bridged with said first plate;

at least one pair of first contact holders mounted on said base and adopted to hold respective first contacts spaced from one another and fixed between said first and second base plates;

a second contact holder on said first base plate provided with an elastic longitudinal lamina formed with a free end;

at least one second contact supported by said lamina and movable between said fixed contacts;

means forming in said housing a longitudinal guiding channel traverse to said lamina;

an actuator slidable in said guiding channel and engageable with said free end of said lamina;

an electromagnetic circuit receivable as a unit in said housing comprising:

a coil body having an axial opening extending therethrough with a coil wound thereabout and having a coil axis extending perpendicular to said channel;

a generally U-shaped iron supporting element formed with a first pole wing extending into said opening, a second wing external to said coil body, and a first cross face bridging said wings; and a generally U-shaped iron keeper element mounted to pivot on said supporting element about a pivot axis transverse to said coil axis at a first wing of the keeper element, said keeper element being formed with a second pole wing extending through said opening, and a cross face bridging said wings of said keeper element, said actuator being formed with connecting means engageably by said second pole wing of said keeper element for moving said actuator along said guiding channel with said lamina switching said second contact between said first fixed contacts; and a cover sealingly shielding said housing.

2. The miniaturized relay defined in claim 1 wherein said first and second pole wings are obliquely disposed relative to said coil axis and form an attraction gap therebetween.

3. The miniaturized relay defined in claim 1 wherein said second wing of the supporting element is larger than said first pole wing, said second pole wing of the keeper element being larger than said second wing of the keeper element.

4. The miniaturized relay defined in claim 1 wherein said actuator is provided with a slide and said connecting means is formed with a seat having a pair of coplanar ribs extending laterally from an end of said second pole wing remote from said second bridge face.

5. The miniaturized relay defined in claim 1 wherein the first wing of the said supporting element is provided with an elastic element, said second wing of the keeper element being provided with a fulcrum lying on said pivot axis upon oscillating of said keeper element and connected with said elastic element, said fulcrum lying at a location approximately one-third of the length of said second pole wing of said keeper element to provide substantially perfect balance thereof.

6. A miniaturized power relay for printed circuits, said relay comprising:

a housing;

a contact-holder block in said housing provided with actuating means for switching at least one switching contact of the relay;

an electromagnetic circuit mounted in said housing, said circuit comprising:

a coil body having an axial opening extending therethrough with a coil wound thereabout and having a coil axis;

a U-shaped one-piece iron supporting element mounted fixed to said housing and formed with a first pole face extending into said opening, a second face external to said coil body, and a first cross face bridging said first pole and second faces, and a U-shaped one-piece iron keeper element mounted pivotal in said housing about a pivot axis traversing said coil axis and operatively connected with said actuating means, said keeper element being formed with a second pole face extending into said opening and juxtaposed with said first pole face, in said opening a second keeper face external to said coil body, and a second cross face spaced axially from said first cross face and bridging said second pole and keeper faces; and a cover sealingly shielding said housing.

7. A miniaturized relay, comprising:

a base unit including:

an elongated first base plate carrying a first fixed contact at an end of said first base plate, an elongated second base plate carrying a second fixed contact spaced from but juxtaposed with said first fixed contact at a corresponding end of said second base plate, means interconnecting said base plates at opposite ends thereof for enabling said second base plate to be urged on said base unit toward said first base plate to adjust a spacing between said fixed contacts, and a lamina carrying a movable contact received between said fixed contacts and secured to at least one of said base plates at a location close to said opposite ends thereof;

an electromagnetic circuit unit receivable in said base unit and comprising:

a coil elongated in a direction of elongation of said base and having plates and having a throughgoing passage, a generally U-shaped supporting magnetic element fixed to said coil and having an inner wing disposed in said passage, an outer wing lying along an exterior of said coil, and a bridge interconnecting said wings, a generally U-shaped movable magnetic keeper element having an inner wing extending through said passage and juxtaposed with said inner wing of said supporting element, an outer wing pivotally connected to said supporting element externally of said coil, and a bridge interconnecting the wings of the keeper element, and an extension on said inner wing of said keeper element operatively connected to said lamina to enable adjusting of a force of said movable contact against one of said fixed contacts by deformation of said extension; and a cover enclosing said electromagnetic circuit unit and fitted on said base unit.

* * * * *